United States Patent [19]

Valerio et al.

[11] 3,713,796
[45] Jan. 30, 1973

[54] LENS POLISHING COMPOSITION CONTAINING DIAMONDS IN AN EPOXIDE RESIN MATRIX

[75] Inventors: Paul F. Valerio; Robert M. Werner, both of Rochester, N.Y.

[73] Assignee: Eastman Kodak Company, Rochester, N.Y.

[22] Filed: Jan. 2, 1969

[21] Appl. No.: 788,655

[52] U.S. Cl. ................................51/298, 51/293
[51] Int. Cl. .............................................C08g 51/12
[58] Field of Search........................51/293, 295, 298

[56] References Cited

UNITED STATES PATENTS 2,860,961   11/1958   Gregor et al. ...........................51/298
2,939,777   6/1960    Gregor et al. ...........................51/298
2,944,879   7/1960    Allen et al. ..............................51/308
3,226,214   12/1965   Daniels et al. ..........................51/298
3,102,011   8/1963    Bellinger ................................51/298

Primary Examiner—Donald J. Arnold
Attorney—Walter O. Hodsdon, Paul R. Holmes and John T. Lewis

[57] ABSTRACT

The use of tiny diamonds for finish polishing of glass lenses has been made possible by incorporating them into a lap material comprising very small diamonds in a special polymeric matrix of the reaction product of an organic epoxide with an appropriate "hardener," such as a polyamine.

10 Claims, No Drawings

LENS POLISHING COMPOSITION CONTAINING DIAMONDS IN AN EPOXIDE RESIN MATRIX

This invention relates to optical polishing materials and methods for use and manufacture thereof.

Lenses and other optical elements are commonly manufactured by grinding such elements to the approximate shape desired and then polishing to remove scratches created in grinding. A small amount of shaping can also be done in polishing. One type of grinding process is carried out in one or more steps using a material made of finely crushed and carefully graded diamonds embedded in sintered or friable metal. The grinding effect can be made either coarse or fine not only by the size of the diamonds used, but also by the character of the sintered metal bonding the diamonds. For example, if the bond is made quite close, the friable part of the metal does not break away as readily and tends to give a finer grind than does a more open sinter. In the grinding operation, a coolant is necessary.

After one or more grinding steps have been performed on a lens, the scratches created in grinding give the surface of the lens a frosted appearance. This frosted appearance is removed by polishing. A common method of polishing involves use of a nonabrasive wax lap combined with a coolant containing an abrasive such as rouge or ceric oxide. It is believed that friction created with the polishing composition and rubbing pressure from the wax heats the surface, thereby giving it a tendency to flow. The material from the ridges of a scratch flow into the depressions of the scratch, thereby eliminating the scratch and making the surface optically usable. It is also believed that some abrasion of the ridge occurs simultaneously.

In the course of the polishing operation, the wax itself has a tendency to flow, thereby filling up indentations which have been cut in the wax for application of polishing composition and coolant. As these indentations are filled up, the operator must recut them or there will be no room for the coolant. Similarly, as the wax flows, it tends to change its shape which in turn has a tendency to change the shape of the lens surface being polished resulting in an inaccurate test-glass fit. Additional polishing steps with a more accurate lap are often used to obtain a good test-glass fit.

In any polishing operation, the polishing compound in the coolant creates a substantial cleaning problem.

Occasionally, with certain materials, a slurry charged with diamond particles of submicron size has been used as the abrasive-coolant in the polishing operation. In general, this has not been successful for high quality glass lens production.

It is an object of this invention to provide an optical polishing lap material having greatly increased life.

It is another object of this invention to sharply reduce or eliminate the need for polishing compositions in the coolant in an optical glass polishing operation.

It is another object of this invention to provide a lens polishing method which requires reduced operator attention.

It is another object of this invention to provide a lap material for optical polishing in which the tendency to flow is reduced or sharply eliminated.

It is another object of this invention to provide a lens polisher which has a tendency to give a superior test-glass fit.

It is another object of this invention to provide polished glass lenses having improved sub-surfaces or substrates (just under the surfaces).

These and other objects are accomplished by manufacture and use of a new lap material for lens polishing. This lap material contains crushed diamonds in a plastic bond thereby supplying the polishing abrasive in the lap material rather than in the coolant. The finely crushed diamonds, surprisingly, operate as polishing abrasives. When bonded in a proper matrix according to the invention the use of diamonds does not result in a scratched optical surface, but instead, results in a highly polished surface.

It is thus a feature and object of this invention to provide a matrix or bond containing tiny diamonds. With this diamond-matrix lap material, glass can be "finish polished" without being scratched. Such a bond constructed according to the invention includes an epoxide which has been polymerized with an appropriate epoxide hardener while the diamond particles are distributed therein. Through out a long life, this bond or matrix somehow holds the diamond particles in such a manner as to prevent grinding or scratching, and to aid the diamonds in polishing the glass.

With the use of this lap material, the following remarkable results can be obtained:

Diamonds which can be crushed and graded to the same size as "grinding" diamonds do not scratch or grind the glass, but polish it;

The polisher (lap material) can be made to provide an order of magnitude more wear than conventional polishers; and The polishing compound in the coolant can be eliminated or sharply reduced, thereby reducing operator attention in cleaning.

The valuable lap materials of this invention can be manufactured by (a) blending together (1) an appropriate organic epoxide compound having an epoxide equivalent of from about 150 to about 450, wherein the epoxide contains an average of at least about 1.5 (preferably about 2) epoxide units or groups per molecule, (2) an appropriate hardener, and (3) from about 5 to about 50 weight percent of diamonds having diameters of from about 1 to about 50 microns, and (b) thereafter permitting a reaction between the epoxide and the "hardener" to occur (preferably by warming the blend in an oven at elevated temperatures up to 250° F or more) to thereby produce the valuable lap materials of this invention. It can readily be appreciated that these lap materials can be shaped in any desired manner by permitting the epoxidation reaction to occur while the materials are contained in a mold, for example. In this manner pellets or shaped polishing blocks of practically any desired size and configuration can be obtained.

Preferred organic epoxide materials are those having epoxide equivalents between about 175 and about 300, and having the basic bisphenol structure:

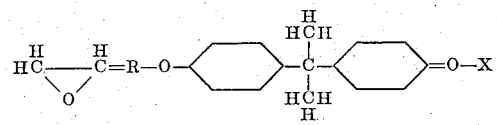

wherein R contains from zero to eight carbon atoms, and X can result from reaction with another bisphenol or bisphenol epoxide. Such bisphenol epoxides and modified bisphenol epoxides are well known in the art and need not be described in great detail herein.

Preferred "hardeners" (for reaction with the epoxide compounds that are useful in the practice of this invention to thereby convert the liquid (or thick fluid) epoxide into the desired, solid matrix) are those organic amines having molecular weights of at most about 200. Typical, non-limiting examples of such preferred "hardeners" include, piperidine, pyridine, diethylene triamine, dimethyl-aminopropylamine, benzyl-dimethylamine, diethylenediamine, diethylaminopropylamine, dibutylaminopropylamine, metaphenylenediamine, triethylene tetramine, and dicyandiamide. Usage of such amine "hardeners" is generally in amounts calculated so that from about 0.5 to about 1.5 (and preferably about 1.0) active amine groups are present in the blend per epoxide unit or group.

In the practice of this invention, it has been found that at least about 50 weight percent of the final lap material must be represented by product(s) of the epoxide-"hardener" reaction. Materials other than diamonds and epoxide-hardener matrix material can also be present in the lap materials of this invention (in minor amounts up to about 20 weight percent). For example, it is believed that the inclusion of up to about 10 weight percent of a phenyl glycidyl ether (a monofunctional epoxide), when included into the original blend of materials, functions as a beneficial plasticizer and/or extender in the final, hardened lap material of this invention. Similarly, dyes and pigments and polyvinyl acetate can be present in the lamp materials of this invention, if desired, without detracting substantially from the valuable benefits that can be obtained by practicing it.

Also, it has been discovered that the presence, in the lap materials of this invention, of up to as much as about 50 volume percent of fairly uniformly dispersed gas bubbles (which appear as "holes" in the final, hardened lap material) actually significantly improves the efficiency of the hardened lap material. Such bubbles can be forced into the lap material by simply beating (or stirring intensively) the fluid blend of epoxide plus hardener plus diamonds to thereby disperse air through the blend, and thereafter "hardening" the matrix while the air bubbles remain entrapped in the matrix. There should generally be at least about 5 volume percent of such gas bubbles (as compared with the "unaerated" volume of the blend), whereas the preferred volume of gas is from about 15 to about 35 percent.

The final solidified lap materials of this invention should preferably contain from about 10 to about 25 weight percent of diamonds having diameters of from about 1 to about 50 microns, and substantially no diamonds having diameters as great as 60 microns. The diamonds in the preferred compositions of this invention have average diameters of from about 5 to about 20 microns, while still further preferred are those diamonds having diameters ranging from about 8 to about 16 microns, with their number average diameter being about 12 microns.

One of the most surprising aspects of this invention relates to the fact that the use of diamonds in accordance herewith results in polishing, rather than grinding. Heretofore, it is believed that there was no way known to accomplish this. Diamonds were believed to scratch too much to be useful in the finish polishing operations of glass lens manufacture. Apparently it is the peculiar combination of ingredients (small diamonds in the epoxy-hardener matrix) that makes this valuable effect possible, because it is apparently only in this way that acceptable polishing with diamonds can be accomplished.

Still another surprising aspect of the present invention relates to the fact that glass finish polishing can be accomplished using the lap materials of this invention in the essential absence of other polishing compositions. This is particularly advantageous in most instances in that it makes possible the elimination of not only expensive recovery (for reuse) of polishing compositions, as well as elimination of the fairly expensive polishing composition itself, but also, it can significantly simplify the final cleaning step, as compared with that of processes that involve the use of conventional polishing compositions.

One of the most valuable contributions of the present invention to the art of glass polishing can readily be appreciated from the fact that the lap materials of this invention have useful lives of as much as 10 or more times that of most conventional lap materials used in high speed polishing. Still another surprising aspect of this development can be appreciated from the fact that lenses polished with the lap materials of this invention have substantially fewer sub-surface scars, and substantially better overall performance characteristics than have lenses polished via practically any conventional method.

In the following examples, all "parts" given are by weight unless otherwise stated.

EXAMPLE 1

Into a conventional stainless steel mixer are poured 763 parts of a modified bisphenol A epoxide having an epoxide equivalent of 200 (sold by Ciba Corporation under the trade name "Araldite 502 Epoxy"), 57 parts of diethylene triamine "hardener," and 164 parts of diamond powder (U.S. B. S. No. 12), with particles having an average diameter of about 12 microns and a range of diameter from 8 to 16 microns. The mixture is stirred vigorously to whip about 20 volume percent of air into it. Then it is poured into molds to form round pellets or discs one-eighth inch high and one-half inch in diameter. The molds are "cured" at 210° F for 12 hours. The resulting solid pellets or "laps" are mounted on a conventional curved block (wherein the radius of curvature around the top surfaces of the pellets equals the desired radius of curvature of the final polished glass elements). Lenses to be polished are mounted on a block (with their top surfaces exposed) having the opposite shape. During the polishing operation, the block holding the lenses is rotated at high speed about the vertical axis. In addition the block holding the lap is oscillated backward and forward and allowed to turn freely on a spinner being separated from the other block only by a coolant or a polishing slurry. Starting with ground lenses, only a few minutes are required to finish polish the lenses using the laps prepared in the foregoing manner. The surfaces of the resulting lenses are found to be brilliant, to have excellent optical quality, and to have a lower level of subsurface defects than are usually obtained in lenses ground using conventional polishing compositions such as ceric oxide or ferioxide rouge, for example.

EXAMPLE 2

Laps are prepared as in Example 1, except that 16 parts of silica aerogel (thickening material sold by Cabot Labs under the trade name "Cab-O-Sil") are blended into the material to aid in the entrapment of air thereinto. Also, curing of the laps is accomplished this time at 160° F for 12 hours. Excellent lens polishing results, similar to those of Example 1, are obtained using the resulting laps.

EXAMPLE 3

Example 1 is repeated, except that the diamond powder is replaced with Cerox (a conventional cerium oxide polishing compound). Lenses "polished" with the resulting solid laps are scratched excessively and not really polished acceptably.

EXAMPLE 4

Example 1 is repeated, except that the diamond powder is replaced with 500-mesh ground glass. Lenses "polished" with the resulting solid laps are scratched excessively, and not polished acceptably.

EXAMPLE 5

Example 1 is repeated, except that half of the diamond powder is replaced with 500-mesh ground glass. Unsatisfactory results similar to those from Example 4 are obtained.

EXAMPLE 6

Example 1 is repeated, except that "Shell 828 Epoxy" is used as the epoxide material and 80 parts of triethylene tetramine "hardener" is used (in place of the diethylene triamine). In addition, 24 parts of the silica aerogel thickener is mixed into the blend. The resulting blend is cured first for 12 hours at room temperature and then for 5 hours at 160° F. The resulting laps show wear rates five times as long as those of conventional wax laps. The use of these laps in lens polishing operations results in excellent polished surfaces on the lenses.

EXAMPLE 7

Example 6 is repeated using 80 parts additional of monoepoxidized alkyl glycidyl ether in the initial blend. The resulting solid lap material finish polishes glass lenses in a manner fully comparable to that of the laps of Example 6.

EXAMPLE 8

Example 1 is repeated, except that 9 micron diameter emery (aluminum oxide) is substituted for the diamond powder. Unacceptably scratched lenses result from attempts to use the resulting laps to finish polish glass lenses.

EXAMPLE 9

Example 1 is repeated without the diamond powder. The resulting laps wear out quickly, and polish glass lenses very slowly.

EXAMPLE 10

Example 1 is repeated, except that the epoxide and hardener are replaced with sintered nylon powder (sold by the Polymer Corporation under the trade name "Nylasint No. 66"). The blend is pressed in a mold under pressure of 3.5 tons, and then sintered for 1 hour at 450°F. Wear rates for the resulting laps are found to be excessively high.

Other epoxide materials having the above-described requisite activity, as well as other well known "hardeners" for such epoxides can be substituted accordingly into Example 1, above to yield useful lap materials for lens polishing, in accordance with this invention.

The invention has been described in detail with particular reference to preferred embodiments thereof, but it will be understood that variations and modifications can be effected within the spirit and scope of the invention.

What is claimed is:

1. A lap material suitable for finish polishing the surface of glass lenses having improved properties; said lap material containing from about 5 to about 50 weight percent of diamonds having diameters of from about 1 to about 50 microns dispersed through and supported by a solid matrix; said solid matrix consisting essentially of the epoxide resin product of the reaction of (a) an organic epoxide compound having an epoxide equivalent of from about 150 to about 450 with (b) an organic amine hardener; said amine having a molecular weight of at most about 200, and substantially all of said diamonds having diameters below 60 microns, and said epoxide resin product being present in said lap material in an amount equal to at least about 50 weight percent of said lap material.

2. A lap material as in claim 1, wherein said lap material also contains gas bubbles dispersed through said matrix; the total volume of said gas being from about 5 to about 50 percent of the unaerated volume of said lap material.

3. A lap material as in claim 2, wherein said organic epoxide compound has an epoxide equivalent of from about 175 to about 300, and said organic amine is an organic polyamine.

4. A lap material as in claim 3, wherein said organic polyamine is a polyalkyl polyamine.

5. A lap material as in claim 4, wherein said organic epoxide material is a modified bisphenol epoxide, containing an average of at least about 1.5 epoxide units per molecule.

6. A lap material as in claim 5, wherein the average particle size of said diamonds is about 12 microns; said lap material being substantially free of diamonds having diameters greater than 60 microns; the amount of said diamonds in said lap material being from about 10 to about 25 weight percent and the amount of said gas in said lap material being from about 15 to about 35 volume percent.

7. A lap material as in claim 2, wherein said lap material also contains from about 0.5 to about 5 weight percent of a silica thickening agent.

8. A lap material as in claim 3, wherein said lap material contains from about 10 to about 25 weight percent of diamonds having diameters of from about 8 to about 16 microns.

9. A lap material as in claim 8, wherein said organic epoxide material contains an average of at least about 1.5 epoxide units per molecule and has an epoxide equivalent of from about 150 to about 450, and the amount of said organic polyamine is equal to from about 0.5 to about 1.5 amine groups per epoxide group.

10. A lap material as in claim 9, wherein said polyamine is a polyalkyl polyamine.

* * * * *